April 25, 1961   R. K. COULTER   2,980,976
MANIFOLD SLIDE DISCONNECT ASSEMBLY
Filed Feb. 17, 1958
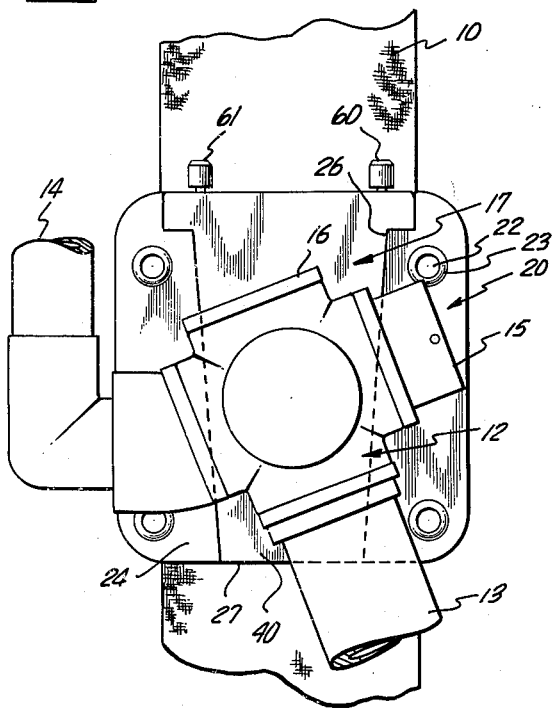
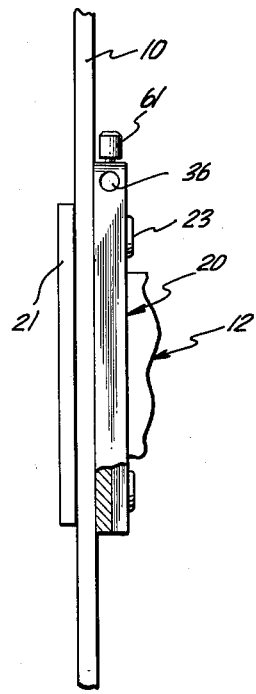
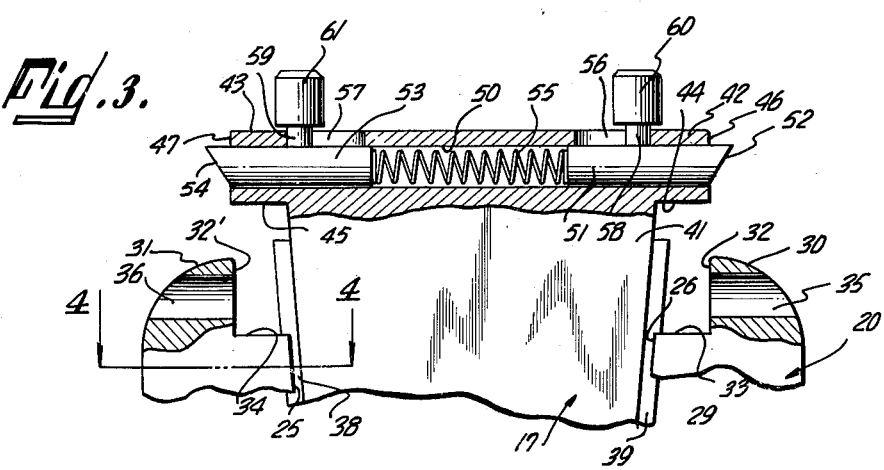
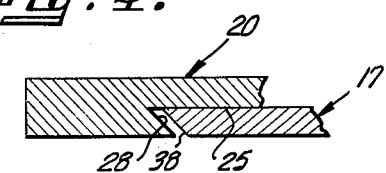
INVENTOR.
RICHARD K. COULTER
BY
BEEHLER & SHANAHAN
ATTORNEYS.

United States Patent Office 2,980,976
Patented Apr. 25, 1961

2,980,976

MANIFOLD SLIDE DISCONNECT ASSEMBLY

Richard K. Coulter, Denver, Colo., assignor to Sierra Engineering Co., Sierra Madre, Calif., a corporation of California Filed Feb. 17, 1958, Ser. No. 715,647

5 Claims. (Cl. 24—223)

The invention relates to latches and has particular reference to a latch or latching assembly which is useful in temporarily fastening a carrier plate to a base plate in a manner permitting easy removal under circumstances where the carrier plate may have one or another of sundry items of equipment fastened thereto such as a valve or oxygen equipment of the type used by fliers.

Accessory devices which are made use of in connection with breathing equipment used by high altitude fliers necessitate certain requirements which in a sense may be considered the antithesis of each other. The accessories must be sufficiently rugged and well constructed to be thoroughly and absolutely dependable under strenuous and exacting circumstances. At the same time they must be compact and of such nature and construction that they are readily transportable and capable of being removed and replaced with a minimum of effort. These requirements are especially requisite in devices such as connections for sundry articles of equipment which must be capable of holding the article in place without danger of inadvertent removal and which when removal becomes necessary or desirable can be immediately and positively manipulated to permit removal with infallible certainty.

Although a great deal of attention has been directed to the development of fastening means for sundry articles in connection with breathing equipment for fliers, the varied requirements which have been above set forth have impaired the production of fastening means sufficiently dependable and sufficiently versatile to prompt wide acceptance.

It is therefore among the objects of the invention to provide a new and improved latch means which is capable of a positive latching or locking engagement in a manner incapable of inadvertent removal and which at the same time can be instantly manually removed whenever the occasion might demand.

Another object of the invention is to provide a new and improved slide disconnect or latch device which is readily attachable to garments and harness in such fashion that when in place it remains firmly in position, thereby to permit ready and easy connection and disconnection of its parts.

Still another object of the invention is to provide a new and improved slide disconnect which is simple and rugged in its construction and assembly to the end that it remains thoroughly dependable under exceptional circumstances.

Still further among the objects of the invention is to provide a new and improved slide disconnect especially well adapted to carrying the manifold of a breathing system and which is of a construction permitting it to be mounted in a convenient location upon the person of the flier in a fashion such that it will not be an obstruction to necessary movements of the wearer and so that it also by reason of its construction as well as its location permits ready separation and consequent removal of the manifold when the need arises.

With these and other objects in view the invention consists in the construction, arrangement and combination of the various parts of the device whereby the objects contemplated are attained as hereinafter set forth, pointed out in the appended claims and illustrated in the accompanying drawings.

In the drawings:

Figure 1 is a front elevational view of a preferred form of the invention shown in place upon a strap and illustrated as equipped with a typical manifold.

Figure 2 is a side elevational view partially broken away.

Figure 3 is a fragmentary partial sectional view of the upper operating portion of the device with the typical manifold removed and showing parts in a position separated one from another.

Figure 4 is a fragmentary sectional view taken on the line 4—4 of Figure 3.

In the embodiment of the invention chosen for the purpose of illustration there is shown by way of example only a strap 10 which may be part of the parachute harness of a flier to which is attached the manifold slide disconnect assembly which is indicated generally by the reference character 11. A manifold 12 is in a position carried by the assembly. The manifold chosen is one to which a supply hose 13 carries oxygen and from which a hose 14 conducts oxygen to the breathing mask of the wearer (not shown). Auxiliary connections 15 and 16 extend in still other directions from the manifold. The manifold in turn is anchored to a carrier plate 17 which is part of the slide disconnect assembly 11.

A base plate 20 is here shown by way of illustration fastened to the strap 10 by use of an anchor or back-up plate 21. Screws 22 extend from the anchor plate through the base plate and nuts 23 on the front face of the base plate permit the anchor plate and base plate to be drawn firmly together anchoring the base plate immovably upon the strap 10.

On the front face 24 of the base plate is a wedge-shaped channel 25 which has an open large end 26 and an open small end 27. Sides of the channel form tracks 28 and 29. The tracks are undercut as best illustrated in Figure 4 where the track 28 is shown.

Adjacent the relatively open large end 26 are abutments 30 and 31 located one on each side, the abutments respectively presenting faces 32 and 32' facing toward each other. Between the face 32 of the abutment 30 and the channel is a land 33. On the opposite side between the face 32' and the channel is a similar land 34. These lands are relatively flat areas forming in effect transversely positioned shoulders.

In the abutment 30 is a recess 35 which for convenience extends entirely through the abutment and communicates with the face 32. A similar recess 36 in the abutment 31 communicates with the face 32'. It will be noted that the recesses 35 and 36 are in axial alignment.

The carrier plate 17 has a wedge shape corresponding to the shape of the channel 25 in the base plate. The carrier plate has opposite oblique sides 38 and 39 complementary respectively in shape to the track 28 and 29. The carrier slide has a relatively small end 40 of substantially the same width as the small end 27 of the channel and a large end 41 of substantially the same width as the large end 26 of the channel.

Adjacent the large end 41 of the carrier plate are a pair of projections 42 and 43 on respectively opposite sides. Between the projection 42 and the side 39 of the carrier plate is a shoulder 44 which is substantially the same length and lies in the same direction as the land 33. A shoulder 45 on the opposite side corresponds in a similar fashion to the land 34. Similarly an end face 46 of the projection 42 is adapted to be moved into face to face position with the face 32 of the abutment 30 and an end face 47 on the projection 43 is adapted to coincide with the end face 32' of the abutment 31.

Extending through the carrier plate in the area of the projections is a bore 50 which is parallel to the axes of the recesses 35 and 36 and is adapted to be moved into axial alignment with those recesses in assembled position. At the left end of the bore, as viewed in Figure 3, is a latch bolt 51 which has a beveled end 52. At the opposite or left-hand end of the bore is a latch bolt 53 with a bevelled end 54. A spring 55 at the mid-portion of the bore urges the respective latch bolts normally outwardly to engaging position with the respective recesses 35, 36.

Slots 56 and 57, respectively, are in a position receiving shanks 58 and 59 of respective knobs 60 and 61. In outermost or engaged position the shanks 58 and 59 abut the end walls of the respective slots 56 and 57.

In operation when it is desired to insert the carrier plate and its attached accessory into the channel 25 for engagement with the base plate 20, the carrier plate is slid into the channel from the open large end. When the carrier plate approaches the position of Figure 1 immediately subsequent to the position of Figure 3, the bevelled ends 52, 54 strike the upper edges of the abutment 30, 31 and move the latch bolts against the action of the spring 55 until the shoulders 44, 45 strike against the land 33, 34. This is the position of Figure 1. In this position the spring 55 urges the latch bolts into the respective recesses 35 and 36, thus locking the carrier plate in position. The position made reference to is one wherein there is not accomplished any wedging of the carrier plate within the channel. Hence, when removal is desired, there is no binding effect to overcome.

When the user desires to remove the carrier plate from the base plate, the knobs 60 and 61 are grasped with the thumb and index finger, respectively, and pressed toward each other to overcome tension in the spring 55. The knobs move toward each other and the shanks travel the length of the slots 56, 57 to opposite ends of the respective slots which is a distance sufficiently great to withdraw the bevelled end of the latch bolts from engagement within the recesses. At this point the carrier plate is completely free for removal from the channel and the base plate.

There has accordingly been illustrated and described herein a very simple and effective slide disconnect which because of its flat construction can be conveniently attached to parachute harness or to other portions of gear or apparel of the flyer or other person to whom some mechanism or device might need to be attached. The attaching mechanism is such that it can be easily located in the most convenient position within arm's reach of the wearer. The mechanism further is of such simple design and construction that it can be very easily manipulated by the wearer for connecting and disconnecting the parts of the device and because of its simple construction it can be made of a sufficiently rugged character to operate and serve successfully under the extraordinary conditions which may exist, for example, when a flyer equipped with such apparatus is ejected from a high speed jet airplane.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention what I claim as new and desire to secure by Letters Patent is:

1. A release connection comprising a base plate having a wedge-shaped channel therein having a relatively wider open end, a wedge-shaped carrier plate having a relatively wider end corresponding to the relatively wider end of said channel, means forming a land on the base plate at each side of the relatively wider end of the channel extending transversely relative to the channel, a projection at each side edge of the carrier plate at the relatively wider end forming a relatively fixed shoulder extending transversely relative to the carrier plate, said shoulder having in assembled position an engagement with the respective land, transversely movable latch bolt means in the relatively wider end of one of said plates normally spring biased to latched position, bolt receiving means in the relatively wider end of the other of said plates, and outwardly extending bolt releasing means on said latch bolt means whereby to enable manual release of said latch bolt means.

2. A release connection comprising a base plate having a wedge-shaped channel therein, said channel having a relatively wider open end, a wedge-shaped carrier plate having a relatively wider end corresponding to the relatively wider end of said channel, sides on said channel having an endwise sliding engagement with corresponding sides on said carrier plate, an abutment at each side of and wider apart than the relatively wider end of the channel and lands between the abutments and the channel extending transversely of the channel, a projection at each side edge of the carrier plate at the relatively wider end forming a shoulder, said shoulder having in assembled position an engagement with the respective land and an end wall in position facing the respective abutment, transversely movable latch bolt means in the relatively wider end of one of said plates normally spring biased to latched position, bolt receiving means in the relatively wider end of the other of said plates, and outwardly extending bolt releasing means on said latch bolt means whereby to enable manual release of said latch bolt means.

3. A releasable connection comprising a base plate, means forming a channel in the base plate comprising a straight track at each side, said sides having oblique positions converging progressively toward each other from an open end of the channel of wider breadth to an end of the channel of lesser breadth, an outwardly extending land positioned transverse to the end of each track adjacent said first identified open end, an abutment at the outer end of each land and means forming a recess in each abutment in axial alignment with the recess in the other abutment, a carrier plate having a length and breadth corresponding to the length and breadth of the channel and comprising opposite side walls converging from a relatively wide end to a relatively narrow end and having each a shape complementary to the shape of the respective track and releasably engagable therewith, a projection on each side of the relatively wide end having a shoulder adapted to engage said respective land in assembled position and an end wall having a face to face position with the resptcive abutment in said assembled position, means forming a transverse bore through said carrier plate in axial alignment with said recesses in said assembled position, bolt means in the bore having beveled outside ends engageable in the respective recess, a spring in the bore operable with the bolt means to normally extend said bolt means, release means on the bolt means extending to an exposed location whereby said bolt means is adapted to be withdrawn from said recesses.

4. A manifold slide disconnect adapted for attachment to strip material comprising a base plate adapted to overlie one face of the material, an anchor plate adapted to overlie the other face of the material and connecting means in anchoring engagement with said plates, means forming a wedge-shaped channel on said base plate having a large end and a small end, a wedge-shaped carrier plate having an assembled position fitting in interlocked position within said channel, transversely positioned mutually engageable shoulder means respectively on the carrier plate and the base plate, a transversely movable spring distended latch bolt means on said carrier plate having a latching position, a latch receiving means on the base plate in engagement with the latch bolt means in assembled position and manually actuable release means on said latch bolt means lying parallel to and adjacent said material adapted to be moved in a direction substantially parallel to the material and against the spring bias whereby to release said latch bolt means.

5. A manifold slide disconnect adapted for attachment to a strap comprising a base plate adapted to overlie one face of the strap, an anchor plate adapted to overlie the other face of the strap and connecting means in anchoring engagement with said plates adapted to pass through the strap, means forming a wedge-shaped channel on said base plate intermediate said connecting means having a large end and a small end, a wedge-shaped carrier plate having an assembled position fitting within said channel, said carrier plate and said base plate having side edges mutually interlocked in assembled position, inwardly facing abutments on said base plate at outer ends of said side edges and end faces on the carrier plate contained between said abutments in assembled position, transversely positioned mutually engageable shoulder means respectively on the large ends respectively of the carrier plate and the base plate, a transversely movable spring distended latch bolt means on said carrier plate having a latching end on each side and having normally a spring bias to latching position, a latch receiving means in said abutment on each side of the base plate in engagement with the latch bolt means in assembled position and manually actuable release knobs on said latch bolt means adapted to be moved against the spring bias whereby to release said latch bolt means.

References Cited in the file of this patent
UNITED STATES PATENTS

| 2,634,481 | Katzman | Apr. 14, 1953 |

FOREIGN PATENTS

| 2,447 | Great Britain | Jan. 30, 1913 |
| 426,102 | Italy | Oct. 21, 1947 |
| 1,123,172 | France | Sept. 18, 1956 |